Aug. 22, 1933.    B. M. COFFEE    1,923,709
SYSTEM OF ELECTRICAL DISTRIBUTION
Filed June 17, 1919
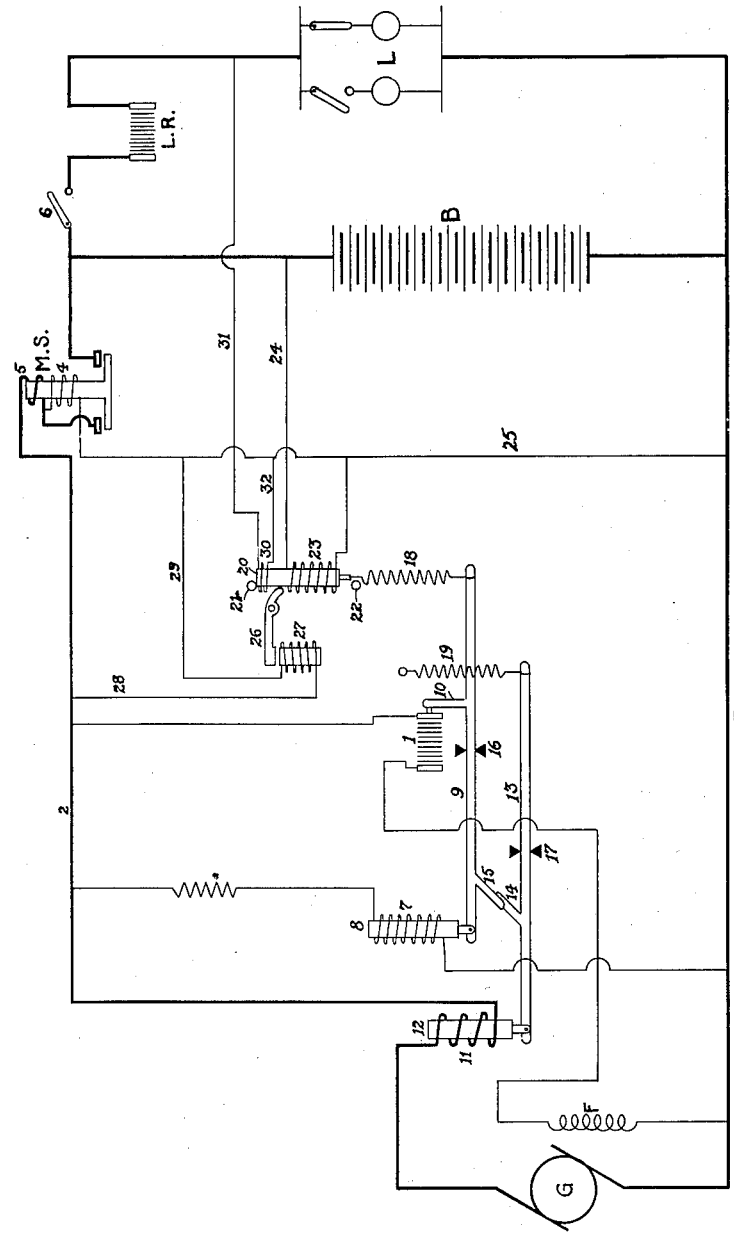
INVENTOR
B. M. Coffee
BY
ATTORNEYS Patented Aug. 22, 1933

1,923,709

UNITED STATES PATENT OFFICE 1,923,709

SYSTEM OF ELECTRICAL DISTRIBUTION

Bassett M. Coffee, Jersey City, N. J., assignor, by mesne assignments, to Simplex Equipment Company, Inc., New York, N. Y., a Corporation of Delaware Application June 17, 1919. Serial No. 304,896

17 Claims. (Cl. 171—313)

This invention relates to electrical systems of distribution and is directed more particularly to an improved system of automatically regulating a generator associated to charge a storage battery and supply current to lamps or other translating devices.

It is an object of the invention to provide novel and efficient means whereby, in a system of the character mentioned the electrical regulation of the generator is governed in accordance with the condition of the battery charged thereby.

It is a further object to provide an improved system of regulation for a variable speed axle driven generator for car lighting, and especially a reliable and efficient system of such a character wherein the standard of generator regulation may be automatically established at successive intervals in accordance with the capacity of the battery and its state of charge while in service.

Another object is to provide a system of the character referred to which possesses various features of functional advantage.

Additional more specific objects and advantages will be in part noted hereinafter in connection with the following description of the accompanying drawing, which illustrates a typical embodiment of the invention, and in which—

The figure is a simplified wiring diagram of an improved system showing, schematically, certain structural parts of the regulator.

Referring more particularly to the drawing, there is represented a car lighting system including an axle driven generator G (having a shunt field F with carbon pile 1 in series) connected by lines 2 and 3 to supply a storage battery B and lamps L. The main switch MS is located between the generator and translating devices and is arranged for control by a voltage coil 4 connected across lines 2, 3 and by a current coil 5 connected in series when the switch is closed. This switch is designed to close when the voltage of the generator reaches a predetermined value, for example, such as corresponds to a train speed of fifteen miles per hour; it remains closed at higher speeds, and automatically opens as the train again slows and the generator voltage falls below the selected value. A lamp switch 6 may be located between the battery and lamps, and a regulator LR is indicated to maintain substantially constant voltage for the translating devices L.

The generator is shown as regulated by electroresponsive means, including a shunt (voltage) coil 7 acting on core 8 attached to lever 9, the latter having an upright 10 normally urged against the carbon pile variable resistance 1, and a series (current) coil 11 acting on a core 12 attached to lever 13, the latter having an offset portion 14 taking under a complementary offset portion 15 of lever 9. Levers 9 and 13 may be respectively pivoted at 16 and 17 and are respectively counteracted upon by tension springs 18 and 19. The arrangement and assembly as thus described permits a variable compression of carbon pile 1, through lever 9 and the voltage coil 7 alone, under certain conditions; or through said lever and coil and lever 13 and coil 11 (by offsets 14, 15) jointly, under other conditions.

In practice, with one design of the system represented, while the switch MS is closed, the regulation of the generator is predominantly effected by current coil 11 during a predetermined initial period of battery charging, and thereafter is effected by voltage coil 7. That is to say, while the state of charge of the battery is such that the pre-selected current may be supplied thereto at relatively low generator voltage, the regulation is predominantly effected by the current coil, which acts to vary the degree of compression of the carbon pile resistance 1, and consequently the strength of field F, in a manner tending to maintain constancy of generator current in spite of speed changes. As, however, the battery becomes more charged with a consequent increase of generator voltage, the pull of coil 7 becomes stronger and finally this coil assumes the regulation by acting on the carbon pile 1 in a manner tending to maintain constancy of generator voltage in spite of speed changes and independently of subsequently altered counter-E. M. F. of the battery. The last stated condition, that is, regulation by coil 7, occurs when the generator voltage attains a value such that the full charge of the battery may be completed at that value, and at the same time such that the current to the battery adequately tapers off as the charge is completed, whereby injurious battery overcharging is prevented. During all of this time, furthermore, the current coil 11 remains in circuit and is available and effective to prevent current output in excess of the limit for which it is set.

By the present invention the standard of voltage constancy (or of generator output so far as speed changes are concerned) to be maintained by coil 7 when active may be effected and established at successive intervals in substantial accordance with the instant storage capacity of the battery. In the embodiment of the invention represented in the figure, to accomplish this purpose the tension spring 18 counteracting on lever 9 is secured at its upper end to a core 20 movable between upper and lower stops 21 and 22 by the pull of a shunt (voltage) coil 23 connected by lines 24 and 25 across the battery B. More specifically, coil 23, responsive to the instant battery voltage while the switch MS is open, for example, while the train is at rest and coil 7 is weakened so as to be ineffective, balances the core 20 at a position commensurate with the battery voltage and the thus indicated battery capacity.

Such movement of core 20, as will be observed, varies the tension or relative position of spring 18 acting against coil 7 on lever 9 and thereby, in effect, alters and establishes the setting of said coil and the generator voltage standard to be maintained constant thereby when regulation of the generator is resumed. Furthermore, the range of movement of the core 20 between its lower and upper stop limits may be calibrated, for example as registering from twenty-eight to thirty-two volts, corresponding to a value of two volts per cell for from fourteen to sixteen cells of the battery. As a result, with the system thus described, in the event that the storage capacity of the battery becomes sub-normal at any time, on account of the presence of dead cells or by reason of battery deterioration, or otherwise, there is automatically introduced in the subsequent regulation a factor of compensation for such condition. In order further to insure the compensating effect of coil 23 to be governed by battery conditions alone, that is, to insure a response of the coil to battery voltage rather than to generator voltage, or charging voltage, means is provided to prevent alteration of the established compensating effect on coil 7 during the time that the generator voltage exceeds the minimum value of the selected battery voltage range for which coil 23 and movement of core 20 is calibrated.

In the present embodiment illustrated, such means includes a pivoted lever 26 on the regulator, having an end adjacent the core 20 and having its opposite end constituting the armature of a coil magnet 27, the winding of the latter being connected by lines 28 and 29—25 across the mains 2 and 3 on the generator side of the switch MS. The construction and association of lever 26 is such that when attracted by magnet 27, its near end engages and holds the core 20 in the then position of the latter. In practice, the winding of magnet 27 may be designed to attract lever 26 while the generator voltage is above, for example, twenty volts. With such designing it will be noted that core 20 of the compensating coil 23 is gripped against movement not only while the battery is on charge and the main switch closed, but also during the actual closing and opening of the main switch. Conversely, coil 23 is thus permitted to exercise its described effect only while the generator voltage is low— typically at zero, while the car is at rest. At each of such intervals, which of course recur frequently while the system is in service, the setting of the regulator is automatically established in substantial accordance with the then existent electrical capacity and condition of the storage battery, so that when the car resumes speed, the generator regulation will be effected at a possibly different, but always proper, standard.

As illustrative of a functional advantage of the system above described, a condition may be assumed in which one of the cells of the battery has become dead. If, then, the charge had progressed to a point where the generator regulation was being effected by voltage coil 7 at a normal value which would have ultimately insured full charge of a normal battery, with no injurious over-charge, it will be apparent that such voltage value, if continued, would result in objectionably over-charging the remaining normal cells. At a train stop, however, with the main switch open and magnet 27 releasing lever 26, the compensating coil 23 would balance the core 20 at an intermediate position corresponding, for example, to the calibrated position indicating thirty volts; that is, two volts per cell for the fifteen remaining normal battery cells. When the car resumed its speed, therefore, the counteracting effect of spring 18 would have been decreased, or conversely, the relative effectiveness of coil 7 increased so that the regulation of the generator, when resumed by coil 7, would be at a substantially constant voltage lower than theretofore and at a new value sufficient to insure an adequate charge to the sub-normal battery, but not so high as to result in an injurious overcharge to the latter.

If desired, a further refined factor of compensation may be introduced in the regulation whereby the balanced position of core 20 is uniform with a given battery condition whether the battery is on open circuit or is on discharge, for example, supplying the lamps. For this purpose there may be added a coil 30 wound about core 20 and acting, when effective, to assist the affect of coil 23; coil 30 being connected by lines 31 and 32 across the lamp circuit on the lamp side of the switch 6. With such an arrangement coil 30 is designed so that when the battery is discharging, for example, when the lamp switch 6 is closed (and the car at rest), the resultant pull on core 20 balances the latter in the same position it would assume if the battery were on open circuit; that is, with the switch 6 open.

It will thus be observed that the system as described reliably effectuates the advantages hereinabove referred to, among others, and that the invention is susceptible of modification and embodiment in other forms, and that certain features of the invention are capable of advantageous application and use independently of the remaining, all with various types of systems.

Having described my invention, what I claim as new and desire to secure by Letters Patent is:

1. The combination with a generator and a battery adapted to be charged thereby, of a regulator for the generator including a shunt coil responsive to generator voltage and operative to maintain substantial constancy of the generator voltage in spite of speed changes, an automatic switch for connecting said generator and battery, and means operative independently of said automatic switch to affect said shunt coil for establishing the generator voltage constancy to be maintained by the latter, but thus operative only while the generator voltage is below a pre-selected value.

2. The combination with a variable speed generator, a battery adapted to be charged thereby and lamps adapted to be supplied by the generator or by the battery, of a regulator for the generator including a shunt coil responsive to generator voltage and operative to maintain substantial constancy of generator voltage in spite of speed changes and independently of the state of charge of the battery through a predetermined range, means for affecting the action of said shunt coil for establishing the generator voltage constancy to be maintained thereby, an automatic switch for connecting and disconnecting said generator and battery in accordance with the relative voltages thereof, electromagnetic means for permitting or preventing actuation of said affecting means, said electromagnetic means being connected to be energized by energy from said generator when said automatic switch is open.

3. The combination with a variable speed generator and a battery adapted to be charged thereby, of a regulator including electro-responsive means influenced only by a function of the generator output to maintain said output substantially constant in spite of speed changes, and electro-responsive means influenced only by a function of the battery on open circuit and on discharge to establish one of a plurality of values of the generator output to be maintained constant, as stated, by said first-mentioned means.

4. In a car lighting system, the combination with a variable speed generator having a shunt field and a variable resistance in series with said field, a battery adapted to be charged by the generator and lamps adapted to be supplied by the generator or by the battery; of electro-responsive means including a shunt coil responsive to generator voltage and operative upon said variable resistance to maintain said voltage substantially constant under predetermined conditions, electro-responsive means including a shunt coil responsive to battery voltage on open circuit, and a shunt coil responsive only to battery voltage on closed circuit operative to affect the subsequent action of said first-mentioned shunt coil to establish the constancy of voltage to be maintained by the latter while the generator voltage is above a pre-selected value.

5. In a car lighting system, the combination with a variable speed generator having a shunt field and a variable resistance in series with said field, a battery adapted to be charged by the generator and lamps adapted to be supplied by the generator or by the battery; of electro-responsive means including a shunt coil responsive only to generator voltage and operative upon said variable resistance to maintain said voltage substantially constant in spite of speed changes and independently of gradual changes of battery counter-E.M.F. through a predetermined range, a shunt coil responsive only to battery voltage on open circuit, and a shunt coil responsive only to battery voltage on closed circuit, said two last-mentioned shunt coils being operative only while the generator voltage is below a pre-selected value to establish the constancy of voltage to be subsequently maintained constant by said first-mentioned shunt coil while the generator voltage is above said pre-selected value.

6. In a car lighting system, the combination with a variable speed generator having a shunt field and a variable resistance in series with said field, a battery adapted to be charged by the generator and lamps adapted to be supplied by the generator or by the battery, a main switch in the line between said generator and said battery, a switch in the line between said battery and said lamps; of a regulator including a shunt coil responsive to generator voltage and operative upon said variable resistance to maintain said voltage substantially constant under certain conditions and compensating means to affect said regulator in accordance with the battery capacity, said means including a shunt coil connected across the battery and a shunt coil connected across the lamps, and means to insure the effectiveness of said compensating means only during relative ineffectiveness of said regulator.

7. In a car lighting system, the combination with a variable speed generator having a shunt field and a variable resistance in series with said field, a battery adapted to be charged by the generator and lamps adapted to be supplied by the generator or by the battery, a main switch in the line between said generator and said battery, a switch in the line between said battery and said lamps; of a regulator including a shunt coil responsive to generator voltage and operative upon said variable resistance to maintain said voltage substantially constant under certain conditions and compensating means to affect said regulator in accordance with the battery capacity, said means including a shunt coil connected across the battery and a shunt coil connected across the lamps, and means to insure the effectiveness of said compensating means only during relative ineffectiveness of said regulator, said last-mentioned means including a shunt coil connected across the lines on the generator side of said main switch.

8. In a system of electrical distribution, in combination, a variable speed generator and a battery connected to be charged thereby, means for regulating a function of the generator output for keeping the same approximately uniform under predetermined conditions, and means compensated for load conditions on said battery for varying the standard of regulation for said function.

9. In a system of electrical distribution, in combination, a generator and a battery connected to be charged thereby, means for regulating a function of the generator output for keeping the same approximately uniform under predetermined conditions, and means responsive to the battery voltage and compensated for load conditions on said battery for varying the standard of regulation for said function.

10. In a system of electrical distribution, in combination, a variable speed generator and a battery connected to be charged thereby, means for regulating a function of the generator output to a predetermined standard irrespective of the generator speed, and means operative only when the generator voltage is below a predetermined value for establishing the setting of said regulating means, and means operating at a generator voltage below said predetermined value for locking or unlocking said last-mentioned means.

11. In a system of electrical distribution, in combination, a variable speed generator and a battery connected to be charged thereby, means for regulating a function of the generator output to a substantially constant value irrespective of generator speed, means operative only when a function of the generator output is below a predetermined value for influencing said regulating means, and means for compensating said second mentioned means for variation of load on said battery.

12. In a system of electrical distribution, in combination, a variable speed generator and a battery connected to be charged thereby, means for regulating a function of the generator output to a predetermined value irrespective of the generator speed, means operative only when a function of the generator output is below a predetermined value for influencing said regulating means, and electro-magnetic means for compensating said second mentioned means for variation of load on said battery.

13. The combination with a variable speed generator, a circuit supplied thereby and a regulator for said generator, a switch connecting said generator to said circuit, of means for operating said regulator responsive to voltage fluctuations across said circuit and automatic means operating independently of said automatic switch for affecting the standard of operation of said responsive means and operated only at such times as the responsive means is substantially ineffective.

14. The combination with a variable speed generator, a regulating element for controlling the same and a voltage responsive coil across said generator for operating said element, of a means for adjusting the standard of operation of said coil thus operating only while the output of the generator is below a predetermined value, a work circuit, an automatic switch connecting said circuit to said generator, and locking means operating on said adjusting means and operative to lock the latter when the output of the generator is above said value but before said switch closes.

15. The combination with a variable speed generator, a storage battery charged thereby, an automatic switch connecting said battery and generator, and a voltage responsive regulator for the generator controlling the voltage impressed thereby upon the storage battery and means for adjusting the voltage held upon the battery by said regulator operating to perform such adjustment only when the output of the generator is below a predetermined value, and means independent of said switch for locking said adjusting means.

16. The combination with a variable speed generator, a storage battery supplied thereby, an automatic switch connecting said battery and generator, and a voltage operated regulator for controlling the generator by limiting the voltage impressed across the battery thereby, of an electro-responsive device and means whereby the same alters the standard of voltage maintained across the battery by said voltage regulator only when the current output of the generator is below a predetermined value, and an electro-responsive device for locking said first-mentioned device after the latter has altered the standard.

17. In a system of electrical distribution, in combination, a generator, a battery to be charged thereby, an automatic switch for controlling the connection between said battery and generator, voltage-responsive means for regulating said generator, means responsive to any one of a plurality of values dependent upon the state of charge of said battery and including a movable element for setting the standard of regulation of said voltage-responsive means, and means energized by energy derived from said generator while said switch is open for locking said movable element.

BASSETT M. COFFEE.